May 11, 1965     J. D. BENNETT     3,182,850

CLOSURE MEANS FOR WITHSTANDING HIGH PRESSURES

Filed Jan. 28, 1963

INVENTOR.

JOHN D. BENNETT

BY

ATTORNEYS

United States Patent Office 3,182,850
Patented May 11, 196.

---

3,182,850
CLOSURE MEANS FOR WITHSTANDING
HIGH PRESSURES
John D. Bennett, Richardson, Tex., assignor to Sun Oil
Company, Philadelphia, Pa., a corporation of New
Jersey
Filed Jan. 28, 1963, Ser. No. 254,135
4 Claims. (Cl. 220—46)

This invention relates to closure means for withstanding high pressures and, more particularly, to a seal for effectively preventing diffusion of fluids, and particularly high pressure gases, over long periods of time.

The present invention relates to a seal which is of the general type disclosed in Patents 3,040,927 and 3,074,589, issued June 26, 1962, and January 22, 1963, to Preston E. Chaney, which type of seal has particular utility in sealing instrument cases adapted to be lowered into bore holes for the purpose of making various types of measurements therein. Although the seals disclosed in the aforementioned patent and application are highly effective, neither completely overcomes all of the problems which are raised by the environmental conditions under which the sensitive instruments must operate. For example, some instruments such as differential pressure gauges require that no gas diffusion occurs across the seal which separates internal chambers from the pressure existing in the bore hole; the latter of which pressures may be of the order of 4,000 p.s.i. On the other hand, it is necessary that the seal be easily assembled and disassembled in the field and, to this end, it is highly desirable that all portions of the seal be re-usable so that a minimum of extra parts and sealing equipment must be maintained on hand in the field.

O rings generally provide excellent seals, but despite their effective actions resulting from mechanical deformation, their materials are not themselves impervious to diffusion, particularly of gases, under extreme pressure conditions.

It is a general object of the present invention to provide an improved high pressure seal which effectively prevents gas diffusion thereacross.

It is a further object of the invention to provide a seal which is easily assembled and disassembled and in which all portions of the seal are completely re-usable.

Figure 2:
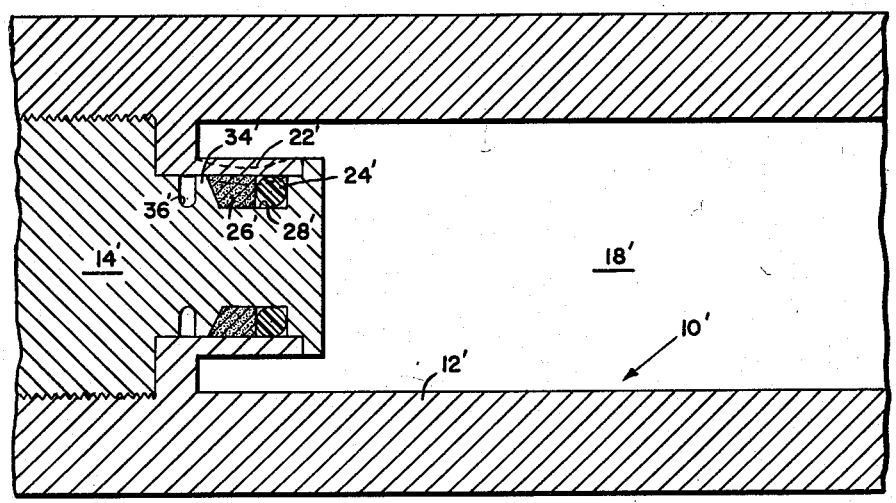
Figure 1:
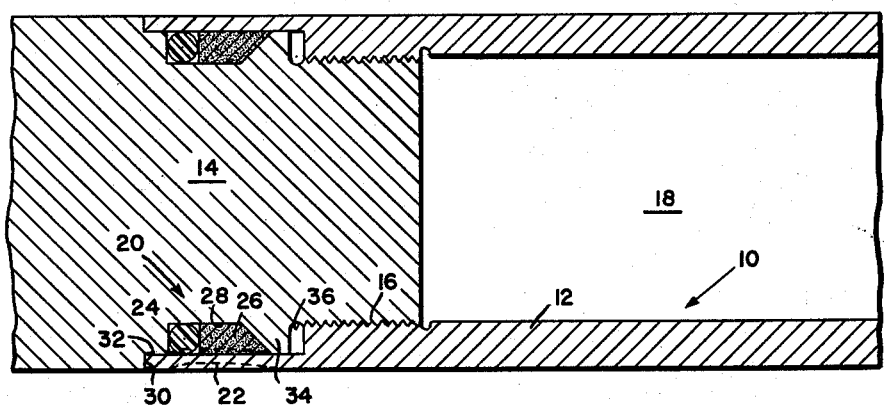

The attainment of the foregoing and other objects of the invention will become apparent from the following description when read in conjunction with the accompanying drawing in which:

FIGURE 1 is an axial section illustrating the arrangement of the seal to prevent external high pressure fluids from entering a protective casing; and FIGURE 2 is an axial section illustrating the arrangement of the seal in order to prevent internal high pressure fluids from escaping from a housing.

Referring first to FIGURE 1, numeral 10 generically designates a protective casing in the form of a cylinder of which portion 12 is designed so as to withstand the maximum pressures which are expected to be encountered in the intended use. For example, the casing may be used to lower various types of logging or other measuring instruments into a bore well. The casing may be composed of any rigid material including both magnetic and non-magnetic materials such as steel and Monel metal or the like so long as the portion 12 is capable of withstanding the environmental pressures without unacceptable deformation.

One end of casing 10 is provided with a closure plug 14 having a threaded portion 16 adapted to engage the threaded internal surface of the casing. The plug and casing collectively define a chamber 18 which is adapted to house instruments to protect them against the externa pressures to which the outside of casing 10 is subjected Of course, the opposite end of the casing may also b provided with a similar closure member and seal or may be otherwise closed as by integral partition.

The seal 20 includes three essential elements 22, 24 an 26 each of which will now be described in detail.

Element 22 is a cylindrical integral portion of casin 10 having a thickness such that it may be deflected ir wardly by the high pressures surrounding the casing This deformability is illustrated by the dotted line pos tion of portion 22 although it is to be understood tha the amount of deflection has been greatly exaggerated fc purposes of clarity since it may be of the order of onl a few thousandths of an inch. Portion 22 has a slidin fit over the reduced diameter cylindrical portion 32 c plug 14 and its free edge abuts shoulder 30 at the en of the reduced portion. The base end of portion 22 abut shoulder 34 which is formed by a groove 28. Thus, th portion 22 is capable of deforming and deflecting inwardl to the dotted line position inwardly of groove 28 unde external pressure.

Element 24 is a conventional O ring which may b composed of Teflon or Viton or the like. O ring 24 i received in the end of groove 28 which is remote fron the threaded plug end and is covered by casing portion 2 extending axially thereacross.

Also disposed in groove 28 is an annular ring 26 whic is composed of a deformable metal such as soft lead o a soft metallic alloy such as those of lead, tin and/or bis muth, or a solid but soft mercury amalgam of variou metals. Ring 26 is initially confined within the spac bounded by O ring 24, groove 28, shoulder 34 and por tion 22, the latter of which extends axially across th outer surface of the ring as well as O ring 24. Howevei the amount of lead comprising ring 26 is initially chose such that the lead does not completely fill the above de fined space. Rather, a slight amount of clearance i deliberately provided between the external surface of rin 26 and the internal surface of portion 22 when the latte is in the cylindrical, non-deflected position illustrated b the solid lines. This provision insures the easy assembl of plug 14 and casing 10 since the lead does not exten radially outwardly of the surface defined by shoulders 3 and 34. Thus, the plug is easily received within the cas ing and may be threaded to a position of tight engage ment between the end of portion 22 and the shoulder 3( The lead, or equivalent, ring may be cast in place b providing a dam about the groove 28. But in view o the conditions indicated hereafter it may also be provide by winding, with overlapping tapered ends a strip o shaped lead within the groove 28. Ultimate pressur will close the resulting joint as will be evident hereaftei A stretched O ring may be put in place after the lead rin is located in the groove.

When the plug and casing have been assembled a shown in FIGURE 1 and external pressure is applied t the assembly, the seal and the various portions thereo act in the following manner:

As the assembly is lowered into the bore hole, the pres sure surrounding the casing gradually increases and, du: ing this period of relatively low pressures, O ring 24 i forced axially against the lead ring and is distorted in th usual fashion to provide an initial seal for preventing th flow of fluid thereacross. The pressure exerted on th O ring causes the lead ring to distort to swell outwardl as it is axially compressed. This swelling produces tigh engagement of the lead with the internal surface of por tion 22 so that the previous clearance is no longer preser between these elements and a slight amount of lead ma start to extrude between the flange 34 and the portio But as the pressure increases, the portion 22 is [forc]ed inwardly into tight engagement with the flange 34 [pre]venting substantial extrusion. The result is that the [seal], under compression, molds itself tightly to all of its [sur]rounding surfaces, flowing into the most minute depressions and so providing an extremely tight metal-to-[met]al closure against flow. The lead acts as the final seal [and] prevents any diffusion of fluid thereacross so long as [the] aforementioned external pressure is maintained, the [met]al-to-metal contact being completely impervious to [flow]. Diffusion cannot occur through the lead.

When the assembly is raised from the bore hole, the [ext]ernal pressure gradually decreases so that portion 22 [ret]urns to its original position and thereby disengages the [sea]l ring. Thus, the assembly may be later disassembled [qui]te easily without interference of the lead. As the [pre]ssure decreases, O ring 24 again performs the primary [sea]ling function, as it did during the pressure increasing [per]iod, the pressure gradient becoming so low that the [O r]ing affords effective sealing so that at no time does [diff]usion occur across the seal.

From the foregoing description it will be apparent that [all] of the elements 24, 26 and 22 form cooperating parts [of] a single seal wherein each of the elements coacts with [the] other elements to provide the combined sealing action. [In] addition, it will be apparent that the provision of elements 24 and 26 in the same groove is of critical importance since these two elements must directly affect one [ano]ther in order to achieve the sealing action set forth [her]einabove.

Referring now to FIGURE 2, it will be apparent that [the] seal and the elements thereof are identical to those [pre]viously discussed and they are accordingly designated [by] the same numerals primed. The sole difference between the arrangements shown in FIGURES 1 and 2 resides in the location of element 22 within housing 10 so [tha]t this element is deflected by the application of internal [rath]er than external pressure. Since the structural elements and their function is identical to that previously described with regard to FIGURE 1, further description [of t]he FIGURE 2 embodiment is unnecessary.

Since numerous modifications and alterations will become readily apparent from the foregoing description, it [is t]o be understood that the invention is not to be limited [oth]erwise than as required by the following claims.

What is claimed is:

1. In combination, a casing member, a closure member cooperating therewith to form a chamber, a groove [in o]ne of said members, an O ring packing and a deformable metallic ring in mutually abutting and contacting [rela]tionship in said groove, the other of said members [hav]ing a deformable portion extending across said rings [so] as to be deflected toward said groove and thereby compress said rings upon the application of high pressure [aga]inst said deformable portion, said rings being confined [wit]hin said groove in abutting contact so that as said deformable portion is deflected toward said groove to compress said rings, said rings transmit distorting movement from one to the other to effect a tight seal between said deformable portion and said groove containing member.

2. In combination, a casing member, a closure member cooperating therewith to form a chamber, a groove in one of said members, an O ring packing and a deformable lead ring in mutually abutting and contacting relationship in said groove, the other of said members having a deformable portion extending across said rings so as to be deflected toward said groove and thereby compress said rings upon the application of high pressure against said deformable portion, said rings being confined within said groove in abutting contact so that as said deformable portion is deflected toward said groove to compress said rings, said rings transmit distorting movement from one to the other to effect a tight seal between said deformable portion and said groove containing member.

3. In combination, a casing member, a closure member cooperating therewith to form a closed chamber within said casing member, a high pressure fluid within said chamber, a groove in one of said members, an O ring packing and a deformable metallic ring positioned in mutually abutting and contacting relationship in said groove, the other of said members having a deformable portion exposed to said high pressure fluid extending across said rings so as to be deflected toward said groove and thereby compress said rings under the force exerted by said high pressure fluid, said rings being confined within said groove in abutting contact with each other and with the groove surface so that as said deformable portion is deflected toward said groove to compress said rings, said rings transmit distorting movement from one to the other to effect a tight seal between said deforming member and said groove containing member.

4. In combination, a casing member, a closure member cooperating therewith to form a closed chamber within said casing member, said casing member being subjected to external high pressure fluid, a groove in one of said members, an O ring packing and a deformable metallic ring positioned in mutually abutting and contacting relationship in said groove, the other of said members having a deformable portion exposed to said high pressure fluid extending across said rings so as to be deflected toward said groove and thereby compress said rings under the force exerted by said high pressure fluid, said rings being confined within said groove in abutting contact with each other and with the groove surface so that as said deformable portion is deflected toward said groove to compress said rings, said rings transmit distorting movement from one to the other to effect a tight seal between said deforming member and said groove containing member.

References Cited by the Examiner
UNITED STATES PATENTS

| | | |
|---|---|---|
| 2,570,406 | 10/51 | Troshkin et al. |
| 2,764,311 | 9/56 | Blackman _____ 220—46 |
| 3,040,927 | 6/62 | Chaney _____ 220—46 |

THERON E. CONDON, *Primary Examiner.*